(12) United States Patent
Recupero

(10) Patent No.: US 7,376,607 B2
(45) Date of Patent: May 20, 2008

(54) SYSTEMS AND METHODS FOR ISSUING AND MAINTAINING A BOND

(75) Inventor: Lisa M. Recupero, Summit, NJ (US)

(73) Assignee: Goldman Sachs & Co., New York, NY (US)

( * ) Notice: Subject to any disclaimer, the term of this patent is extended or adjusted under 35 U.S.C. 154(b) by 144 days.

(21) Appl. No.: 11/174,171

(22) Filed: Jul. 1, 2005

(65) Prior Publication Data

US 2006/0004644 A1 Jan. 5, 2006

Related U.S. Application Data

(60) Provisional application No. 60/585,354, filed on Jul. 2, 2004.

(51) Int. Cl.
*G06Q 40/00* (2006.01)

(52) U.S. Cl. .......................................... 705/35; 705/37

(58) Field of Classification Search ............. 705/35–45
See application file for complete search history.

(56) References Cited

U.S. PATENT DOCUMENTS

| | | |
|---|---|---|
| 2002/0107771 A1 | 8/2002 | McGuire |
| 2002/0156719 A1 | 10/2002 | Finebaum et al. |
| 2002/0184142 A1 | 12/2002 | Whang |
| 2003/0093375 A1 | 5/2003 | Green et al. |
| 2004/0098327 A1 | 5/2004 | Seaman |
| 2004/0162774 A1* | 8/2004 | Golden .................... 705/36 |
| 2005/0102213 A1 | 5/2005 | Savasoglu et al. |
| 2005/0262000 A1 | 11/2005 | Sato |

FOREIGN PATENT DOCUMENTS

WO   WO 03/058393 A2   7/2003

OTHER PUBLICATIONS

Thormodsgard, Diane, "A Message from the President", Corporate Trust Connection, Winter 1999, US Bank Corporate Trust Services. 4pgs.

* cited by examiner

*Primary Examiner*—Richard Weisberger
(74) *Attorney, Agent, or Firm*—Buckley, Maschoff & Talwalkar LLC

(57) ABSTRACT

According to some embodiments, a bond is issued to an investor in exchange for value. The bond may be, for example, a tax-free municipal bond associated with (i) a spread to a predetermined index, (ii) a nominal maturity date, (iii) an initial mandatory tender date prior to the nominal maturity date, and/or (iv) an option for the investor to extend the initial mandatory tender date during an initial decision period. According to some embodiments an indication is received, during the initial decision period, indicating that the investor will extend the initial mandatory tender date. It may then be arranged for the initial mandatory tender date to be extended such that the bond will be associated with a subsequent option for the investor to extend an extended tender date during a subsequent decision period.

13 Claims, 12 Drawing Sheets

| ISSUER IDENTIFIER 1002 | ISSUER NAME 1004 | BONDS 1006 | CONTACT INFORMATION 1008 |
| --- | --- | --- | --- |
| ISS-101 | NEW CITY | B101, B203 | JOHN@NEW.GOV |
| ISS-102 | NORTH COUNTY | B235 | (555) 555-5555 |
| ISS-103 | TOWN OF WEST VALLEY | B213, B864, B634 | 15 MAIN STREET WEST VALLEY, CT |

| INVESTOR IDENTIFIER 1202 | INVESTOR NAME 1204 | BONDS 1206 | EXTEND 1208 | CONTACT INFORMATION 1210 |
| --- | --- | --- | --- | --- |
| INV-101 | FUND_123 | B101, B102, B103 | Y, Y, N | JANE@123.COM |
| INV102 | FUND_ABC | B612 | Y | SAM@ABC.COM |
| INV103 | FUND_SAMPLE | B634 | Y | (123) 555-5555 |

FIG. 12

SYSTEMS AND METHODS FOR ISSUING AND MAINTAINING A BOND

CROSS-REFERENCE TO RELATED APPLICATIONS

The present application claims the benefit of U.S. Provisional Application No. 60/585,354 entitled "System and Method for Issuing and Maintaining a Bond" and filed Jul. 2, 2004. The entire content of that application is incorporated herein by reference.

COPYRIGHT AUTHORIZATION

A portion of the disclosure of the patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The present invention relates to bonds. In particular, the present invention relates to systems and methods for issuing and maintaining a bond.

BACKGROUND

In some cases, an entity may borrow money from an investor and issue a bond to the investor bearing a stated rate or rates of interest (or a formula that can be used to determine a rate of interest) that will mature on a pre-determined date (e.g., five years after the bond was issued). When the maturity date arrives, the entity re-pays the investor (e.g., the principal and interest).

A mutual fund may pool money from many investors and invest the money in stocks, bonds, short-term money-market instruments, and/or other securities. Moreover, a money market fund is a type of mutual fund that may be required by laws or regulations (e.g., regulations of the Securities and Exchange Commission) to invest in relatively low-risk securities. A money market fund may invest in government securities, certificates of deposits, commercial paper of companies, and/or other highly liquid and low-risk securities. By way of example, a money market fund might invest in a tax-exempt municipal bond issued by a highly rated state or local governmental unit.

The requirements imposed on money market funds may limit the types of bonds that the fund can purchase. For example, a fund might be prevented from investing in a bond structure that lacks a guaranteed level of liquidity. The structure of a particular bond may also have tax consequences for a fund or other investors.

SUMMARY

To alleviate problems inherent in the prior art, the present invention introduces systems and methods for issuing and maintaining a bond.

According to some embodiments, a bond is issued to an investor in exchange for value. The bond may be, for example, a tax-free municipal bond associated with (i) a spread to a pre-determined index; (ii) a nominal maturity date; (iii) an initial mandatory tender date prior to the nominal maturity date, and/or (iv) an option for the investor to extend the initial mandatory tender date during an initial decision period. According to some embodiments an indication is received, during the initial decision period, indicating that the investor will extend the initial mandatory tender date. It may then be arranged for the initial mandatory tender date to be extended such that the bond will be associated with a subsequent option for the investor to extend an extended tender date during a subsequent decision period.

Another embodiment comprises: means for issuing a bond to an investor in exchange for value, wherein the bond is associated with (i) a spread to a pre-determined index; (ii) a nominal maturity date; (iii) an initial mandatory tender date prior to the nominal maturity date, and (iv) an option for the investor to extend the initial mandatory tender date during an initial decision period; means for receiving, during the initial decision period, an indication that the investor will extend the initial mandatory tender date; and means for arranging for the initial mandatory tender date to be extended such that the bond will be associated with a subsequent option for the investor to extend an extended tender date during a subsequent decision period.

With these and other advantages and features of the invention that will become hereinafter apparent, the invention may be more clearly understood by reference to the following detailed description of the invention, the appended claims, and the drawings attached herein.

BRIEF DESCRIPTION OF THE DRAWINGS

FIG. 10 is a portion of an issuer database according to one embodiment of the present invention.

FIG. 12 is a portion of an investor database according to one embodiment of the present invention.

DETAILED DESCRIPTION

Figure 1:
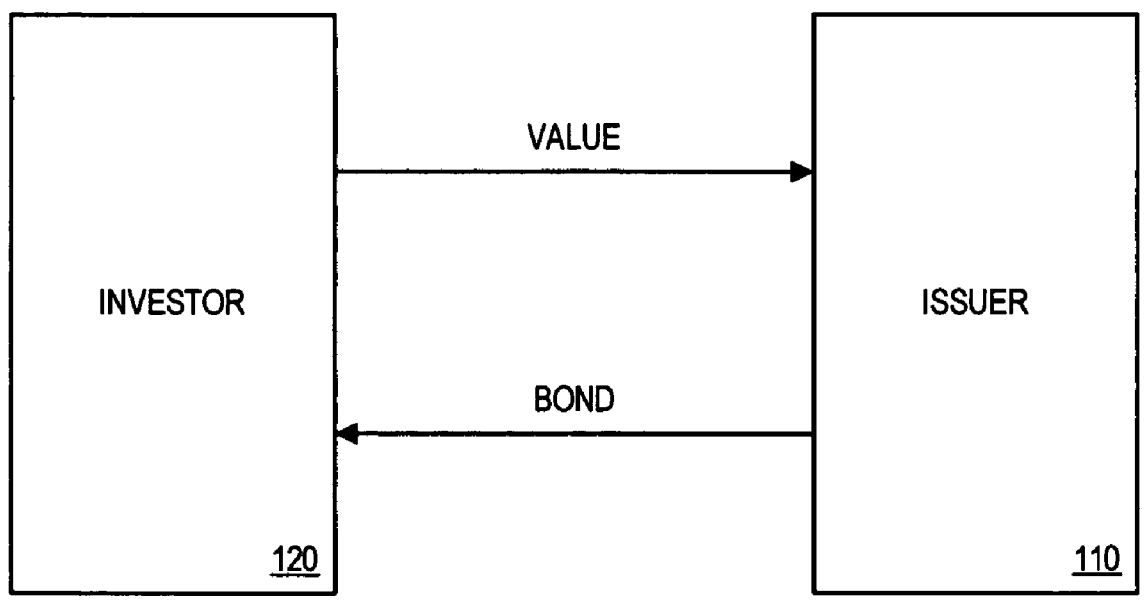
FIG. 1 illustrates an issuer issuing a bond to an investor in exchange for value.
Figure 2:
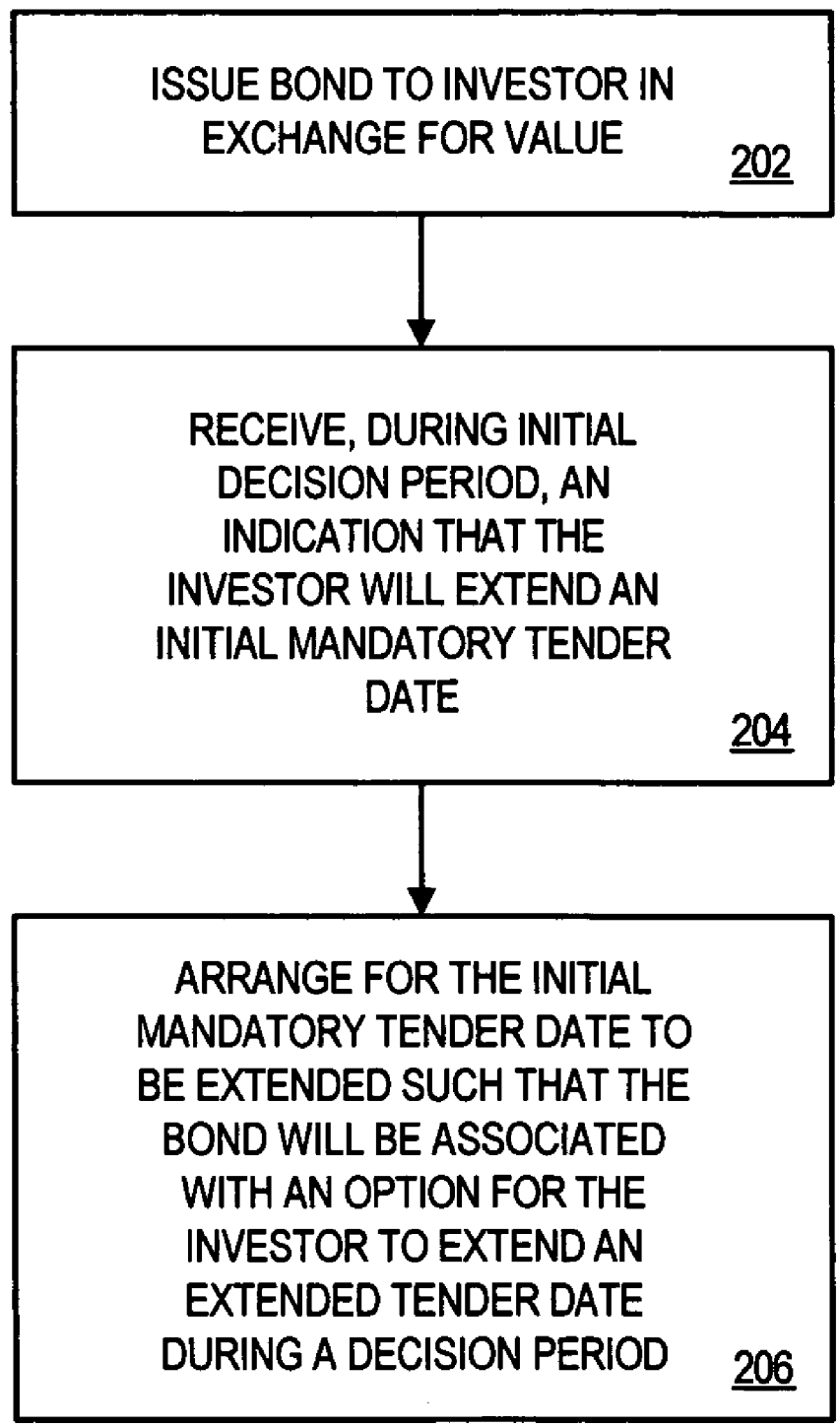
FIG. 2 is a flow chart of a method according to some embodiments of the present invention.

FIG. 1 illustrates an issuer 110 issuing a bond to an investor 120 in exchange for value. For example, a governmental unit might issue a bond to an investor in exchange for an amount of money. FIG. 2 is a flow chart of a method that might be performed, for example, by the issuer 110 of FIG. 1 and/or a third party to the transaction according to some embodiments of the present invention. The flow charts described herein do not imply a fixed order to the steps, and embodiments of the present invention may be practiced in any order that is practicable.

At 202, a bond is issued to an investor in exchange for value. The bond might be, for example, a tax-free municipal bond bearing a rate of interest defined as spread to a pre-determined index. By way of example, the bond might have an interest rate defined as being 10 basis points (each basis point representing one hundredth of one percentage point or 0.01%) higher than the Bond Market Association Municipal Swap Index (BMA index) as of a particular date. Although the BMA index is used herein as an example, note that embodiments might be associated with other indexes, such as the Standard & Poor's J. J. Kenny Weekly High Grade Index #1.

The bond may also be associated with a "nominal" maturity date. For example, the bond might have a nominal maturity date 10 years after the date the bond issues. According to some embodiments, the bond is also associated with an initial "mandatory tender date" prior to the nominal maturity date. The mandatory tender date may be, for example, a date on which the investor has the right to demand full payment from the issuer.

According to some embodiments, the bond is also associated with an option for the investor to extend the initial mandatory tender date during an initial decision period. For example, the initial decision period might be a pre-determined day (e.g., one month after the bond is issued) on which the investor can decide to extend the initial mandatory tender date.

At 204, an indication is received during the initial decision period. The indication might comprise, for example, an electronic message indicating that the investor will extend the initial mandatory tender date. In this case, it is arranged at 206 for the initial mandatory tender date to be extended such that the bond will now be associated with a subsequent option for the investor to extend an extended tender date during a subsequent decision period. According to some embodiments, steps 204 and 206 are performed on a periodic basis (e.g., a monthly basis).

Figure 3:
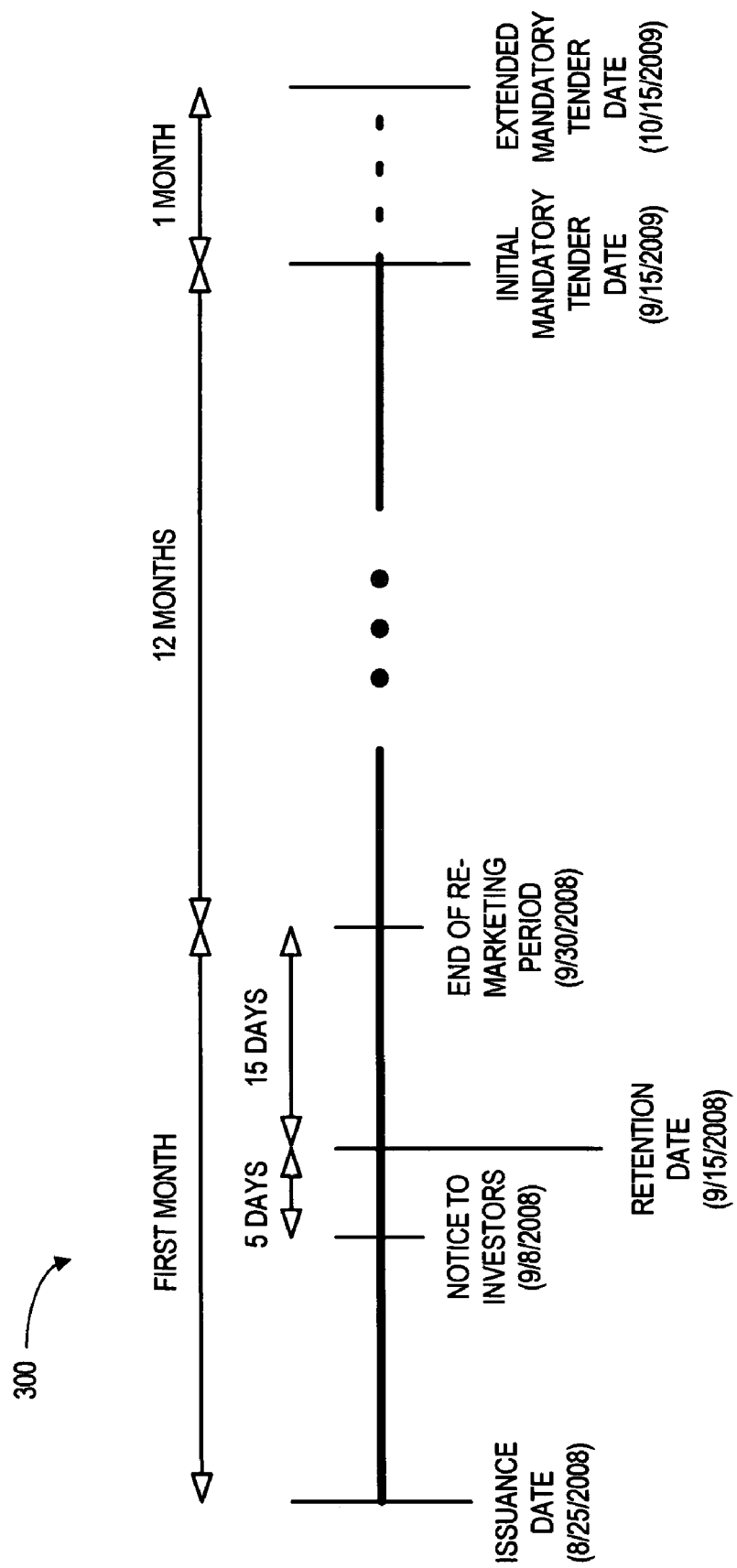
FIG. 3 is a time line of a bond issued in accordance with some embodiments of the present invention.

By way of example, FIG. 3 is a time line 300 of a bond issued in accordance with some embodiments of the present invention. In this case, the bond was issued to an investor on Aug. 25, 2008. The bond might comprise, for example, a municipal bond with a nominal 30 year maturity date issued to a money market fund.

Moreover, an initial mandatory tender date for the bond is set at thirteen months from the date the bond was issued, or Sep. 15, 2009. That is, the investor has the right to demand re-payment of the investment on that date.

The bond is also associated with a decision period during which the investor has the right to extend the initial mandatory tender date. In particular, the bond has an initial "retention date" of Sep. 15, 2008 and on that date, the investor can elect to extend the initial mandatory tender date by one month (e.g., from Sep. 15, 2009 to Oct. 15, 2009). This option to extend is repeated on a monthly basis. That is, on Oct. 15, 2008 the investor can elect to extend the Oct. 15, 2009 tender date to Nov. 15, 2009.

Note that the period between the initial decision period and the initial mandatory tender date is substantially greater than the period between the initial mandatory tender date and the extended tender date (e.g., one year as compared to one month). Moreover, the period between the initial mandatory tender date and the extended tender date is substantially less than the period between the date the bond was issued and the initial mandatory tender date (e.g., one month as compared to thirteen months).

According to some embodiments, it is arranged for the investor to receive, prior to the end of the initial decision period, a notification associated with the option to extend the initial mandatory tender date. For example, five days before the retention date (or Sep. 8, 2008), investors might receive an email reminding them of the upcoming retention date. As other examples, the notification might comprise a paper notification (e.g., a letter mailed to the investor) and/or an oral notification (e.g., a telephone call). Moreover, notifications might be transmitted via a communication network and/or a Graphical User Interface (GUI) (e.g., via a Web site).

Note that an investor might decide to not extend a tender date. According to some embodiments, the bond provides for a "re-marketing period" during which the issuer or a third-party can try to find another investor to pay the original investor (and who is willing to extend the tender date). For example, a re-marketing period might end two weeks after the retention date, or Sep. 30, 2008.

Figure 4:
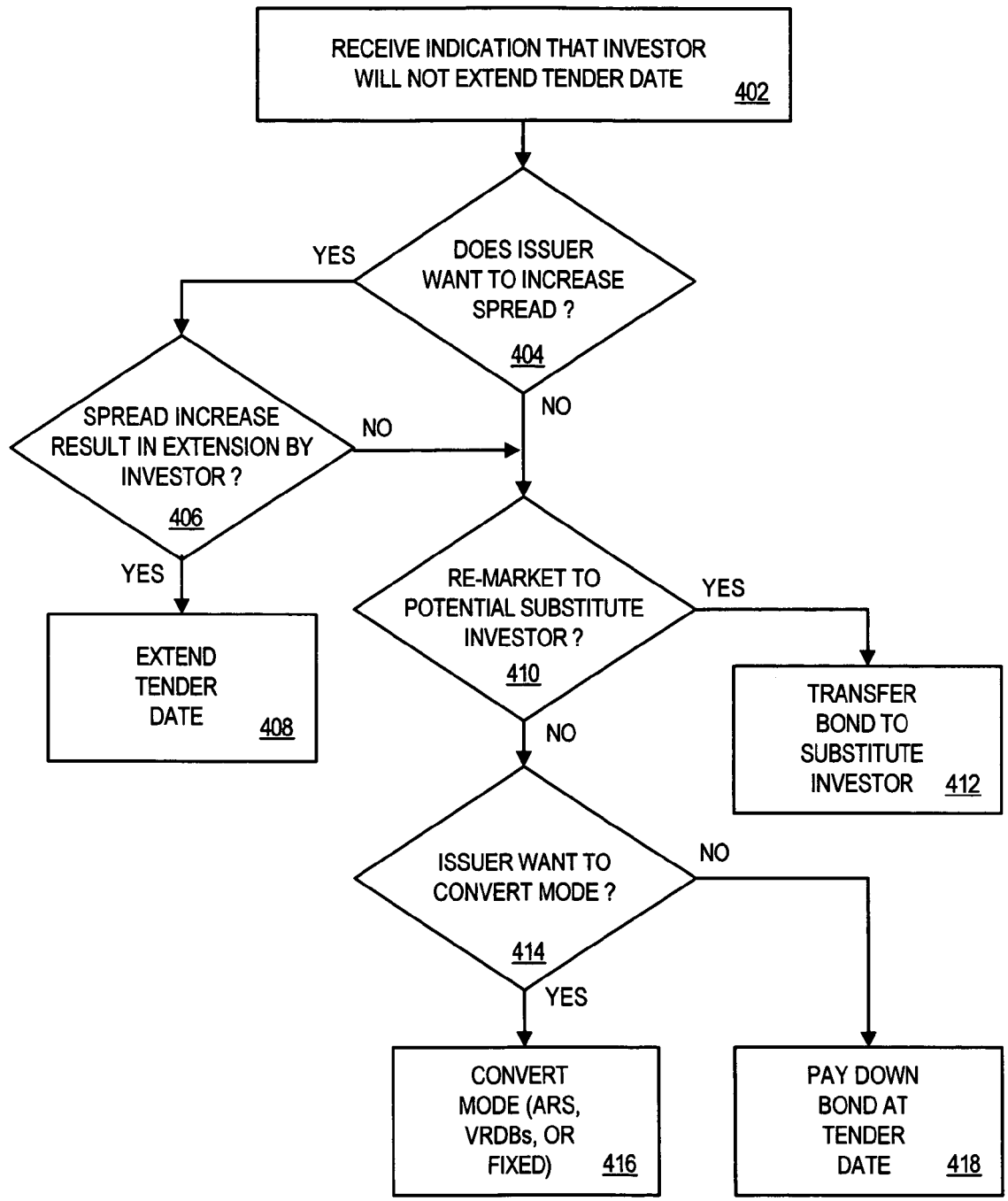
FIG. 4 is a flow chart of a method that may be performed when an investor does not extend a tender date according to some embodiments of the present invention.

FIG. 4 is a flow chart of a method that may be performed when an investor does not extend a tender date according to some embodiments of the present invention. At 402, an indication is received indicating that the investor will not extend the current mandatory tender date. The message might comprise, for example, an email, a letter, or a telephone. Moreover, the indication might be received via a communication network and/or a GUI (e.g., via a Web site).

It is determined at 404 if the issuer is willing to increase the bond's spread to the pre-determined index. For example, the investor might be willing to extend the bond if the issuer increases the spread to the BMA index from 10 basis points to 15 basis points. If such an approach is successful at 406, the tender date is extended at 408. Note that this option might be permitted, for example, at any point prior to the end of a re-marketing period (e.g., to enhance the marketability of bonds not retained).

If such an approach does not resolve the issue, the bond may be re-marketed to potential substitute investors at 410. If an appropriate substitute investor is found, the bond may be transferred to them at 412. If no substitute investor is willing to purchase the bond, it may be determined at 414 whether or not the issuer is interested in converting a mode associated with the bond. If so, the mode may be converted at 416. For example, the mode might be converted to an Auction Reset Security (ARS), a Variable Rate Demand Bond (VRDB), and/or a fixed instrument. If the issuer does not want to convert the bond, the investor may simply be paid when the tender date arrives at 418. According to some embodiments, the issuer may have the right to call or convert a bond whenever an investor decides to not extend a tender date (this is, the issuer does not need to wait until the tender date arrives). Such an approach may, for example, benefit issuers by letting the issuer "time" a re-financing or conversion during the one year period.

Figure 5:
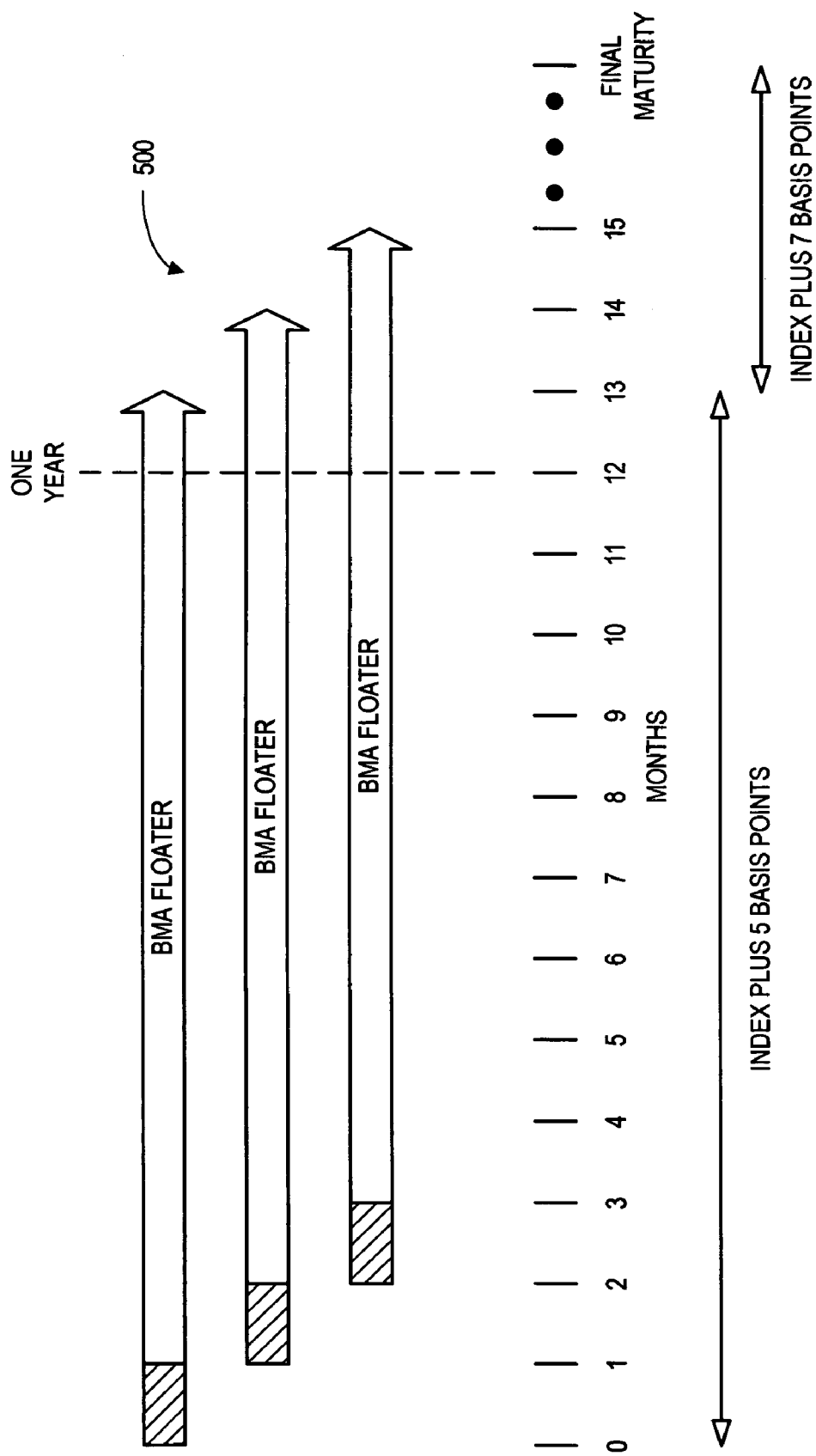
FIG. 5 is a time line of a bond issued in accordance with some embodiments of the present invention.

Assuming a stable credit rating for the issuer, the mandatory tender date may continue to shift forward each month, approaching the final nominal maturity date. FIG. 5 is a time line 500 of a bond issued in accordance with some embodiments of the present invention. As before, the bond is structured to have an initial mandatory tender date 13 months from issuance, and bondholders may elect to retain the bond one year in advance of that date (and thus shift the mandatory tender date back one month). Note that more than one spread might be associated with a single bond. For example, the spread during the first 13 months might be set at 5 basis points above the BMA index and then increase to 7 basis points. Such an approach might, for example, encourage holders to retain the bond.

Figure 6:
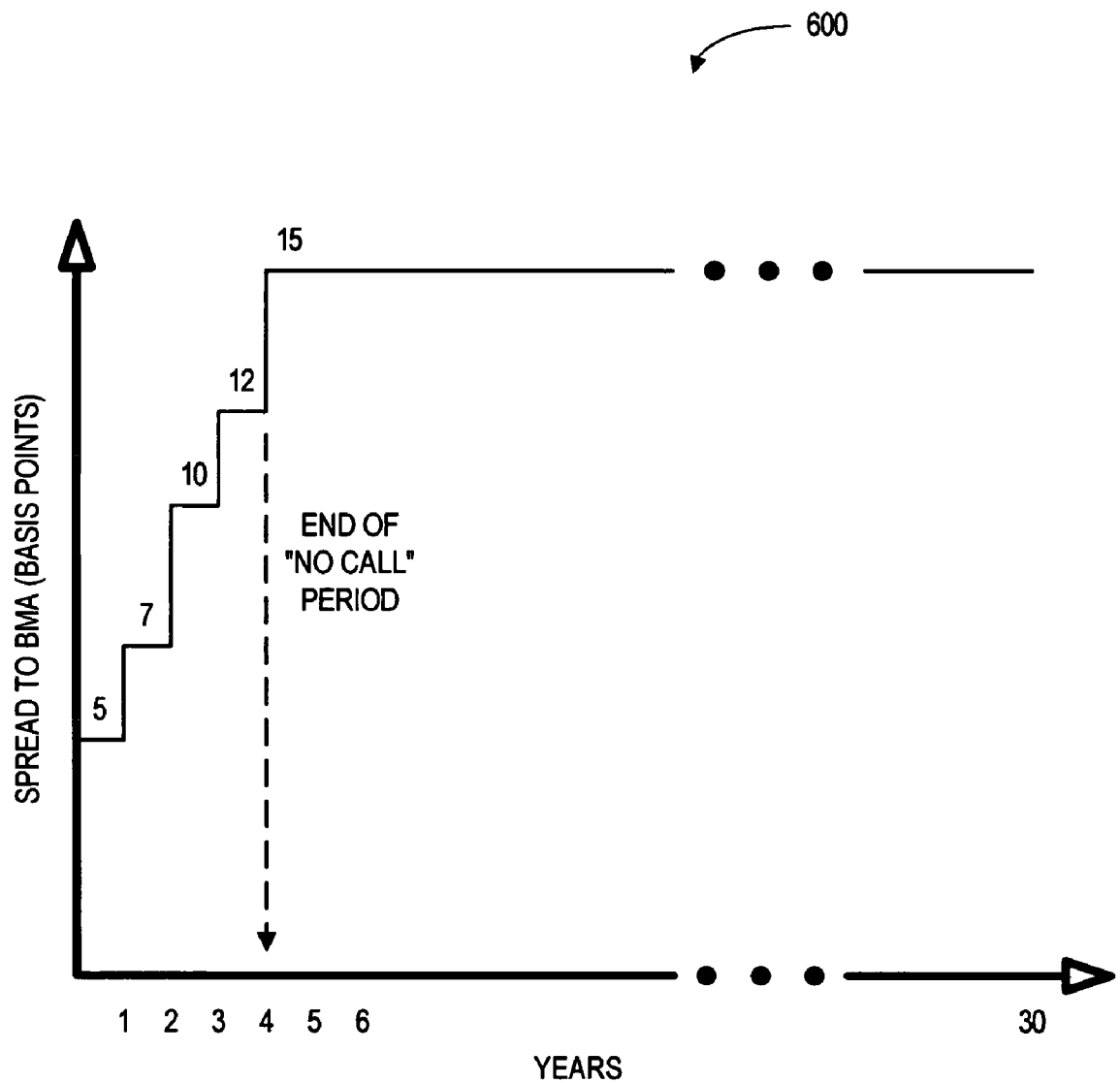
FIG. 6 illustrates a pre-determined spread that increases according to some embodiments of the present invention.

According to some embodiments, a coupon, determined at closing, is a spread to the BMA index that steps up annually to provide investors an incentive to extend. For example, FIG. 6 illustrates a pre-determined spread 600 that increases according to some embodiments of the present invention. The spread 600 might, for example, level out after an initial 3 or 5 year no-call period. Moreover, according to some embodiments interest might be payable monthly on the 15th calendar day (or preceding business day). Note that the spread 600 to the pre-determined index may be associated with pre-determined increases at pre-determined times. According to some embodiments, an issuer of the bond may retain the right to increase the spread 600 (e.g., to encourage retention).

Figure 7:
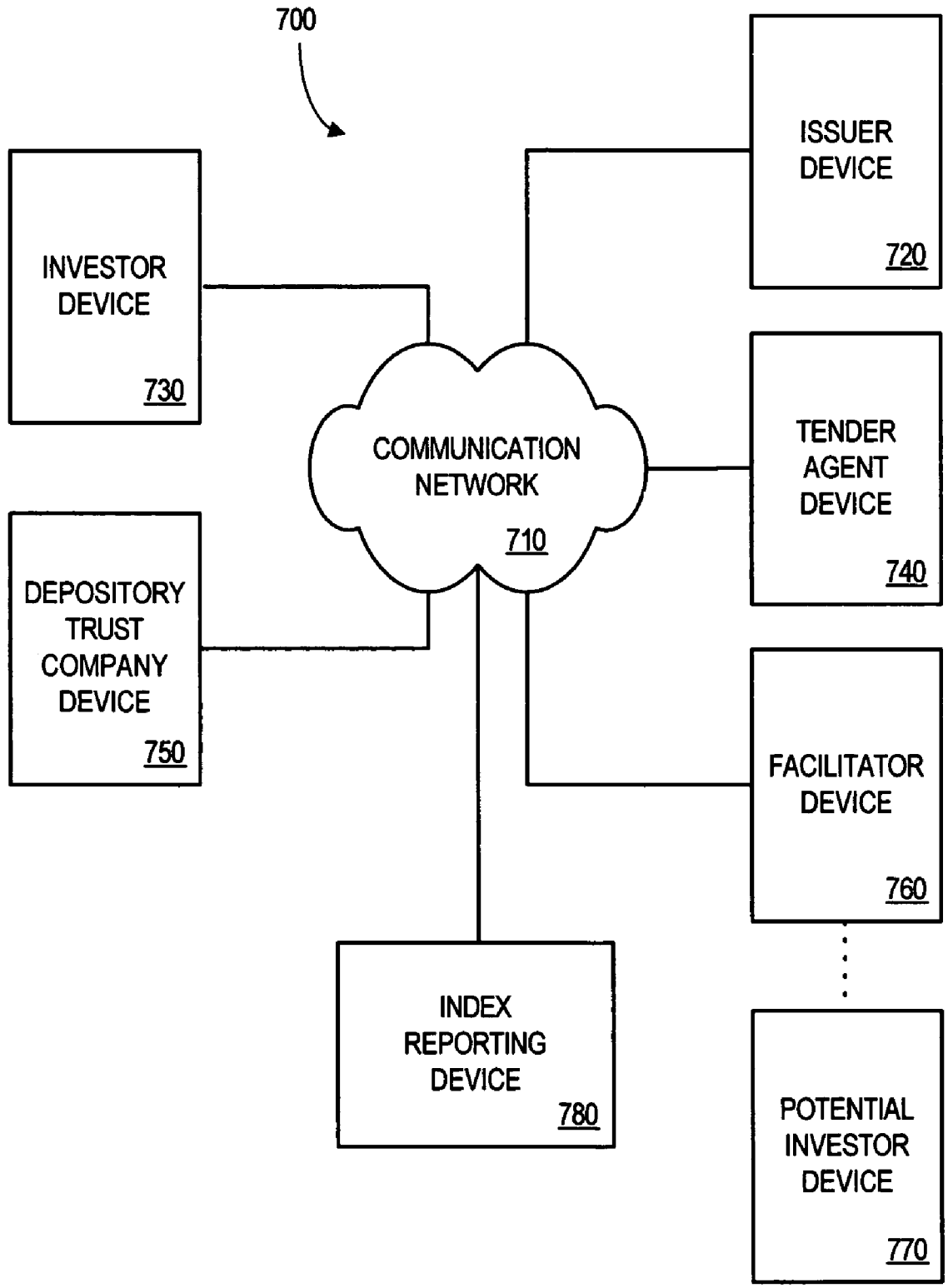
FIG. 7 is a block diagram overview of an automated system according to some embodiments of the present invention.

FIG. 7 is a block diagram overview of an automated system 700 according to some embodiments of the present invention. The system might include, for example, an issuer device 720, an investor device 730, a tender agent device 740, a Depository Trust Company (DTC) device 750, a facilitator device 760, a potential investor device 770, and/or an index reporting device 780 that communicate via a communication network 710.

The devices 720-780 may be any devices capable of performing the various functions described herein. For example, an investor device 730 might be a Personal Computer (PC) associated with a "client." As used herein, the term "client" may refer to, for example, an individual or entity that owns, buys, and/or sells bonds.

The issuer device 720 may, for example, store information about one or more bonds and may update the information as appropriate (e.g., when bonds are paid or extended). The issuer device 720 might also check to make sure that a tender agent has distributed reminders to investors, confirm responses from a trustee, and/or plan for mandatory tenders, conversions, and/or re-funding when investors do note extend mandatory tender dates.

The investor device 730 may, for example, receive reminders from the DTC device 750 and/or transmit indications to the DTC device 750 (e.g., whether or not a mandatory tender date should be extended). The investor device 730 might also update a database when tender dates are extended. Note that the issuer device 720 and/or investor device 730 might also receive information about a pre-determined index from the index reporting device 780 (e.g., the current value of the BMA index).

The tender agent device 740 may, for example, send notifications of extension dates to investors via the DTC device 750, receive investor responses from the DTC device 750 and notify the issuer device 720 and/or a re-marketing agent of investor responses.

The DTC device 750 may, for example, receive notifications and distribute information about the notifications to participants (e.g., who may then distribute information to ultimate investors), receive responses from investor devices 730, and/or arrange for a new security to be provided to investor accounts when a mandatory tender date is not extended.

The facilitator device 760 might, for example, generate inquiries to as to whether investors have received extension notices, transmit reminders to investor devices 730, generate bids for bonds upon a request from an investor device 730, follow-up with investors that have not submitted an election, and/or remarket bonds via the potential investor device 770 when a bond is not extended.

The facilitator device 760 may be, for example, a Web server adapted to exchange information via an Internet Protocol (IP) network (e.g., the Internet). Note that the communication network 710 might comprise one or more other networks, including an intranet, a Local Area Network (LAN), a Metropolitan Area Network (MAN), a Wide Area Network (WAN), a proprietary network, a Public Switched Telephone Network (PSTN), and/or a wireless network.

According to some embodiments, the facilitator device 760 communicates with other devices via a temporary computer communication channel (e.g., a path through which information can be exchanged). In other words, the communication channel between the facilitator device 760 and another device may be established and discontinued as appropriate. Note that an established communication channel does not need to be associated with a particular physical path. For example, the facilitator device 760 may exchange information with a remote investor device 730 via a Web site, in which case packets of information may be transmitted via various physical paths.

According to other embodiments, the facilitator device 760 communicates with other devices via a public computer communication network. That is, at least a portion of the communication network 710 may be accessed by devices other than the devices described herein. Note, however, that the information exchanged by the facilitator device 760 could be encrypted or otherwise protected to prevent a third party from accessing (i.e., understanding) the information.

According to still other embodiments, the facilitator device 760 communicates with devices via a computer communication channel that is potentially accessible by a plurality of unrelated devices. For example, a single port or line associated with the facilitator device 760 might communicate with a first investor device 730 for a period of time and then with a second, unrelated investor device (i.e., the first and second client devices may be associated with different funds).

Although devices 720-780 are shown in FIG. 7, any number of these devices may be included in the automated system 700. Similarly, any number of other device described herein may be included according to embodiments of the present invention. Note that some of devices illustrated in FIG. 7 may actually be incorporated in a single device. For example, the facilitator device 760 may also act as a tender agent device 740.

Figure 8:
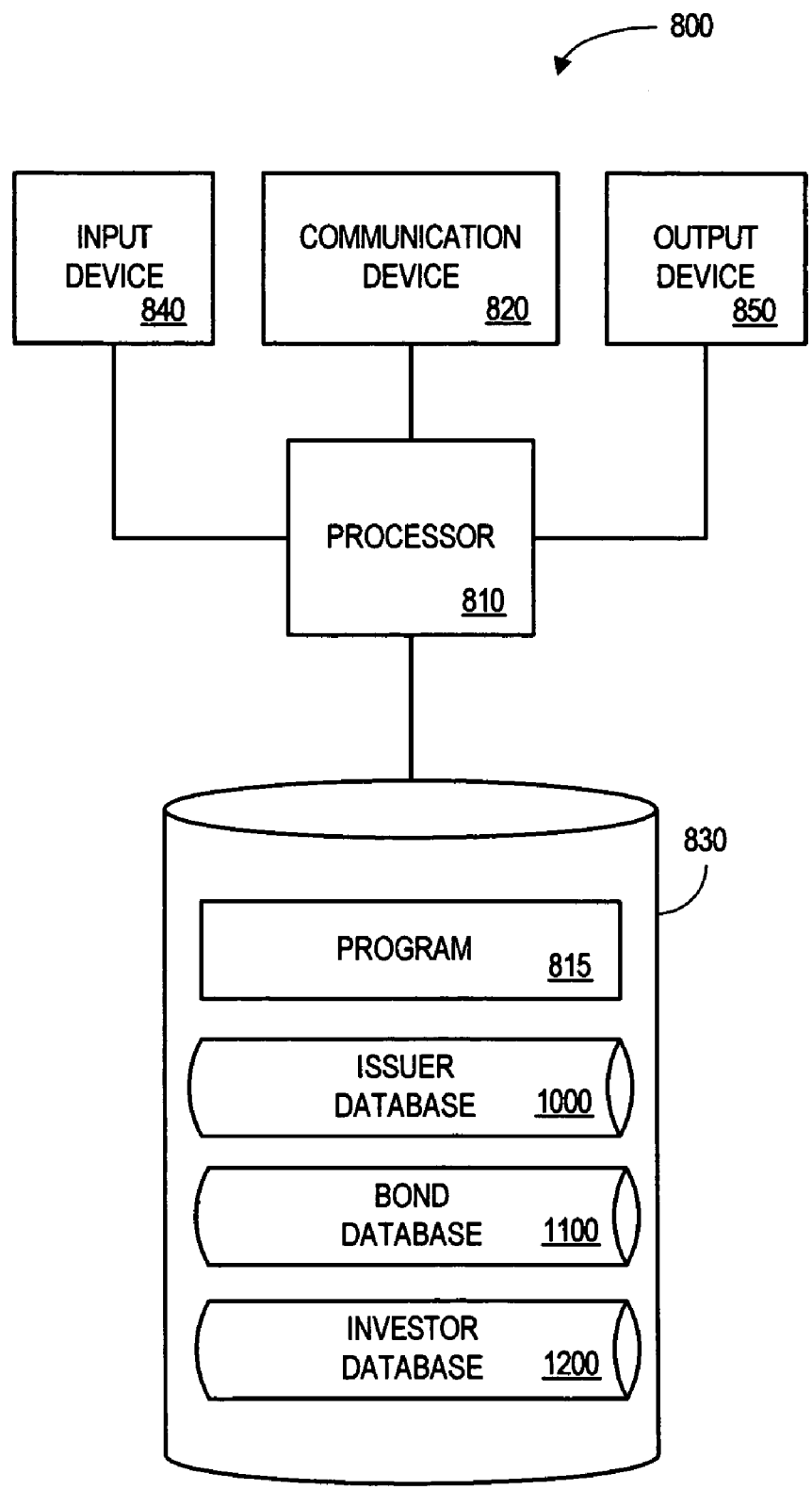
FIG. 8 is a block diagram of an apparatus according to some embodiments of the present invention.
Figure 9:
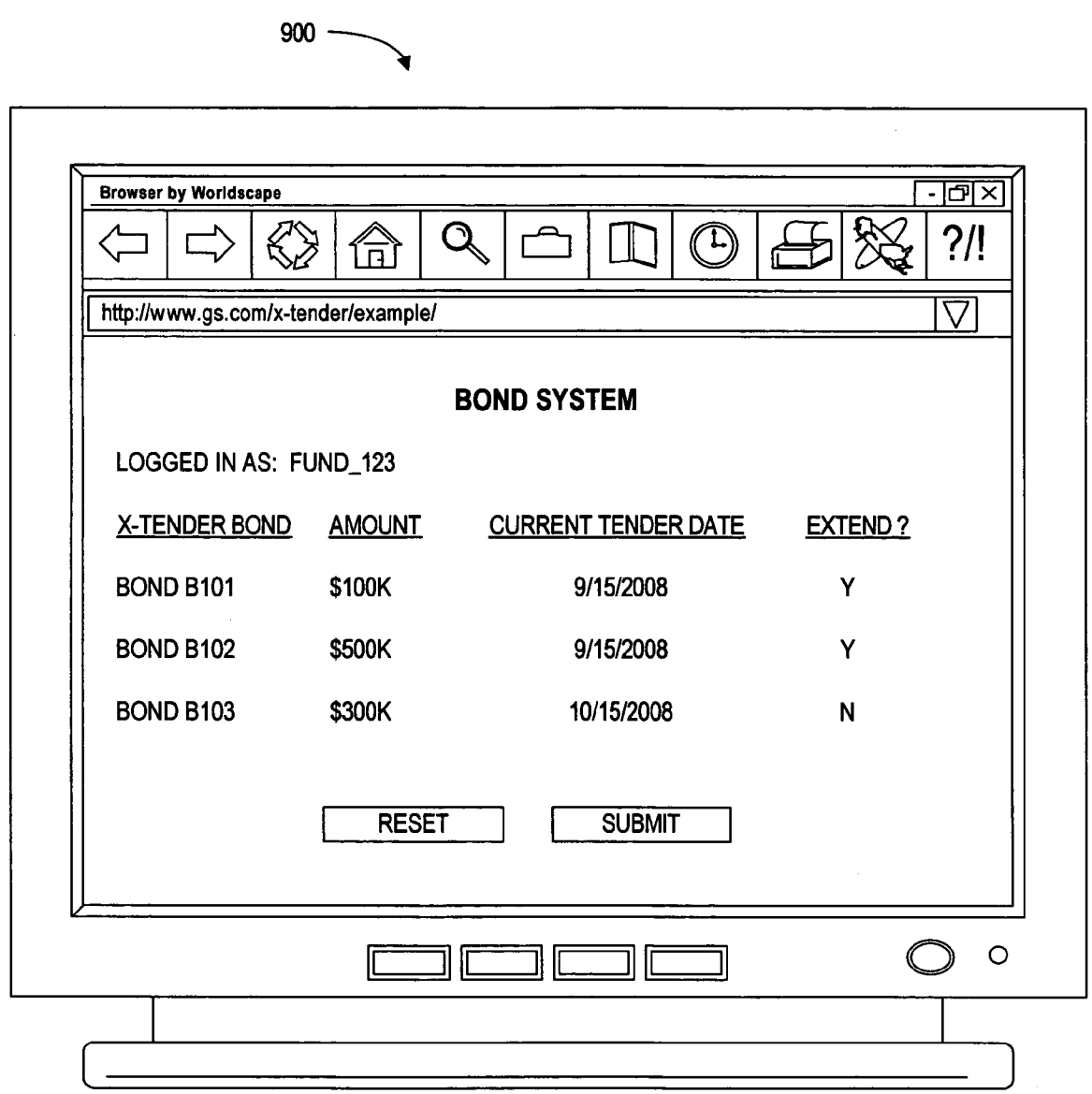
FIG. 9 illustrates a graphical user interface display according to some embodiments of the present invention.

FIG. 8 is a block diagram of an apparatus 800 that might be associated with any of the devices 720-770 illustrated in FIG. 7 according to some embodiments of the present invention. The apparatus 800 comprises a processor 810, such as one or more INTEL® Pentium® processors, coupled to a communication device 820 configured to communicate via a communication network. The communication device 820 may be used to communicate, for example, with one or more issuer device 720, investor devices 730, tender agent devices 740, DTC devices 750, facilitator devices 760, and/or potential investor devices 770. The apparatus 800 may further include an input device 840 (e.g., a mouse and/or keyboard to input bond information) and an output device 850 (e.g., a computer monitor to output bond information). For example, FIG. 9 illustrates a GUI display 900 according to some embodiments of the present invention.

Referring again to FIG. 8, The processor 810 is also in communication with a storage device 830. The storage device 830 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 830 stores a program 815 for controlling the processor 810. The processor 810 performs instructions of the program 815, and thereby operates in accordance with the present invention. For example, the processor 810 might: arrange for a tax-free, long-term municipal bond to be priced and/or issued to an investor; receive during an initial decision period, an indication that the investor will extend an initial mandatory tender date; and/or arrange for the initial mandatory tender date to be extended such that the bond will be associated with an option for the investor to extend an extended tender date during a decision period, wherein said receiving and arranging are performed periodically.

As used herein, information may be "received" by or "transmitted" to, for example: (i) the apparatus 800 from another device; or (ii) a software application or module within the apparatus 800 from another software application, module, or any other source.

As shown in FIG. 8, the storage device 830 also stores: an issuer database 1000 (described with respect to FIG. 10); a bond database 1100 (described with respect to FIG. 11); and an investor database 1200 (described with respect to FIG. 12). Examples of databases that may be used in connection with the apparatus 800 will now be described in detail with respect to FIGS. 10 through 12. The illustrations and accompanying descriptions of the databases presented herein are exemplary, and any number of other database arrangements could be employed besides those suggested by the figures.

Referring to FIG. 10, a table represents the issuer database 1000 that may be stored at the apparatus 800 according to an embodiment of the present invention. The table includes entries identifying issuers that may be associated with bonds. The table also defines fields 1002, 1004, 1006, 1008 for each of the entries. The fields specify: an issuer identifier 1002, an issuer name 1004, a list of bonds 1006, and contact information 1008. The information in the issuer database 1000 may be created and updated, for example, based on information received from an issuer device 720.

The issuer identifier 1002 and issuer name 1004 may represent a particular bond issuer. The list of bonds 1006 might indicate, for example, which bonds have been issued by the particular issuer associated with that entry. The contact information 1008 may indicate how the issuer should be contacted. For example, an issuer might be notified when an investor decides to not extend a bond via an email message to a particular address.

Figure 11:
FIG. 11 is a portion of a bond database according to one embodiment of the present invention.

FIG. 11 is a portion of a bond database 1100 according to one embodiment of the present invention. The table includes entries identifying bonds that have been issued. The table also defines fields 1102, 1104, 1106, 1108, 1110, 1112, 1114 for each of the entries. The fields specify: a bond identifier 1102, an amount 1004, an issue date 1006, a nominal maturity 1108, a next decision date 1108, a current tender date 1112, and a status 1114. The information in the bond database 1100 may be created and updated, for example, based on information received from an issuer device 720 and/or an investor device 730.

The bond identifier 1002 might represent a particular bond. For each bond, the amount 1104 might indicate a value associated with the bond, the issue date 1106 may indicate when the bond was issued, and the nominal maturity 1108 may reflect the nominal date when the bond will mature (e.g., ten years from the issue date 1106). The next decision date 1110 may indicate the period during which an investor can decide if the current tender date 1112 will be extended. The status 1114 might indicate, for example, whether the tender date has been extended, whether the bond is currently being re-marketed, or whether an investor's decision has not yet been received (e.g., the decision is "pending").

FIG. 12 is a portion of an investor 1200 database according to one embodiment of the present invention. The table includes entries identifying investors how have purchased bonds. The table also defines fields 1202, 1204, 1206, 1208, 1210 for each of the entries. The fields specify: an investor identifier 1202, an investor name 1204, a list of bonds 1106, an indication of extension 1208, and contact information 1210. The information in the bond database 1100 may be created and updated, for example, based on information received from an investor device 730.

The investor identifier 1202 and 1204 might represent an investor who has purchased on or more bonds or a potential investor. The list of bonds 1206 may reflect the bonds that are currently owned by that particular investor. The indication of extension 1208 may list, for each of those bonds 1206 whether or not the investor will extend a current mandatory tender date. The contact information 1210 may indicate how the investor should be contacted. For example, an investor might prefer to receive a reminder via a email message to a particular address.

In this way, the bond may be structured so as to provide a sufficient amount of liquidity for the investor. In particular, the extension mechanism might reduce the need for liquidity facility by providing a substantial "workout" period during which the issuer can resolve the situation (e.g., a one year period) and permitting payment obligations through various means (e.g., re-marketing or mode conversion). As a result, the bond may provide sufficient guaranteed liquidity to let it be purchased by a tax-free money market fund. With respect to the investor, the structure may ensure that an investor that is no longer interested in holding the bond will not need to hold the bond for more than thirteen months. Moreover, the bond may be structured to avoid substantial tax penalties. Also note that, unlike a bank draw, some embodiments of the present invention may be structured such that the rate does not increase during the workout period. Another advantage associated with some embodiments of the present invention is that a non-extension by an investor is discreet (unlike a bank draw for a failed remarketing or failed auction) and thus does not send a wide signal to the market.

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments of the present invention have been described with respect to a single day on which an investor can decide whether or not a tender date will be extended, not that a decision period could be longer (e.g., a particular week) or shorter (e.g., before noon on a particular day). Moreover, although some embodiments have been described with respect to an affirmative indication that the investor will (or will not) extend a mandatory tender date other approaches could be used. For example, a lack of response from an investor might be defined as an indication that the current mandatory tender date will not be extended.

The present invention has been described in terms of several embodiments solely for the purpose of illustration.

Persons skilled in the art will recognize from this description that the invention is not limited to the embodiments described, but may be practiced with modifications and alterations limited only by the spirit and scope of the appended claims.

What is claimed is:

1. A method, comprising:
    issuing a bond to an investor in exchange for value, wherein the bond is associated with (i) a spread to a pre-determined index, (ii) a nominal maturity date, (iii) an initial mandatory tender date prior to the nominal maturity date, and (iv) an option for the investor to extend the initial mandatory tender date during an initial decision period;
    receiving, during the initial decision period, an indication that the investor will extend the initial mandatory tender date;
    in response to receiving the indication, extending and re-setting the tender date; and
    updating option parameters to reflect the extended tender date and decision period.

2. The method of claim 1, wherein the nominal maturity date is at least ten years, the initial mandatory tender date is substantially thirteen months from the date the bond was issued, a decision period is associated with a period substantially one year before a current tender date, and the extended tender date is substantially thirteen months from the initial decision period.

3. The method of claim 1, further comprising:
    arranging for the investor to receive, prior to the end of the initial decision period, a notification associated with the option to extend the initial mandatory tender date.

4. The method of claim 3, wherein the notification is associated with at least one of: (i) an electronic notification, (ii) a paper notification, (iii) an oral notification, (iv) a communication network, or (v) a graphical user interface.

5. The method of claim 1, wherein an issuer of the bond retains the right to increase the spread.

6. The method of claim 1, further comprising:
    receiving, during a decision period, an indication that the investor will not extend the tender date.

7. The method of claim 1, wherein the pre-determined index is associated with at least one of: (i) the Bond Market Association Municipal Swap Index, (ii) the Standard & Poor's J. J. Kenny Weekly High Grade Index #1, or (iii) any other pre-determined index.

8. The method of claim 1, wherein said extending is associated with at least one of: (i) a tender agent, (ii) a depository trust company, (iii) the investor, or (iv) an issuer.

9. An apparatus, comprising:
    a processor;
    a communication device coupled to the processor and adapted to communicate via a communication network; and
    a storage device in communication with the processor and storing instructions adapted to be executed by the processor to:
        facilitate an issuance of a bond to an investor in exchange for value, wherein the bond is associated with (i) a spread to a pre-determined index, (ii) an initial mandatory tender date, and (iii) an option for the investor to extend the initial mandatory tender date during an initial decision period,
        automatically arrange for the investor to receive, via the communication device and prior to an initial decision period, a notification associated with the option to extend the initial mandatory tender date,
        receive, during the initial decision period, an indication that the investor will extend the initial mandatory tender date,
        in response to receiving the indication, extend and re-set the tender date, and
        update option parameters to reflect the extended tender date.

10. The apparatus of claim 9, wherein the storage device further stores at least one of: (i) an issuer database, (ii) a bond database, or (iii) an investor database.

11. The apparatus of claim 9, wherein the communication device is adapted to communicate with at least one of: (i) an issuer device, (ii) a tender agent device, (iii) a deposit trust company device, (iv) a facilitator device, (v) an investor device, or (vi) potential investor device.

12. The apparatus of claim 9, wherein execution of the stored instructions further enable the processor to:
    receive the indication via the communication device.

13. A computer-readable medium storing instructions adapted to be executed by a processor to perform a method, said method comprising:
    issuing a bond to an investor in exchange for value, wherein the bond is associated with (i) a spread to a pre-determined index, (ii) a nominal maturity date, (iii) an initial mandatory tender date prior to the nominal maturity date, and (iv) an option for the investor to extend the initial mandatory tender date during an initial decision period;
    receiving, during the initial decision period, an indication that the investor will extend the initial mandatory tender date;
    in response to receiving the indication, extending and re-setting the tender date; and
updating option parameters to reflect the extended tender date and decision period.

* * * * *